US009258047B2

(12) United States Patent
Li et al.

(10) Patent No.: US 9,258,047 B2
(45) Date of Patent: Feb. 9, 2016

(54) MIMO BEAMFORMING METHOD AND METHOD OF CONSTRUCTING A DIFFERENTIAL CODEBOOK FOR A WIRELESS NETWORK

(71) Applicant: Intel Corporation, Santa Clara, CA (US)

(72) Inventors: Qinghua Li, San Ramon, CA (US); Senjie Zhang, Beijing (CN); Hongming Zheng, Beijing (CN); Shanshan Zheng, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/086,025

(22) Filed: Nov. 21, 2013

(65) Prior Publication Data

US 2014/0078996 A1 Mar. 20, 2014

Related U.S. Application Data

(60) Continuation of application No. 13/437,162, filed on Apr. 2, 2012, which is a division of application No. 12/584,142, filed on Sep. 1, 2009, now Pat. No. 8,149,791.

(51) Int. Cl.
*H04W 4/00* (2009.01)
*H04B 7/06* (2006.01)
(Continued)

(52) U.S. Cl.
CPC ............ *H04B 7/0617* (2013.01); *H04B 7/0434* (2013.01); *H04B 7/0456* (2013.01); *H04B 7/0478* (2013.01); *H04B 7/0641* (2013.01); *H04W 16/28* (2013.01); *H04B 7/0465* (2013.01)

(58) Field of Classification Search
CPC ..... H04L 5/0007; H04L 27/206; H04L 1/243; H04L 43/50; H04L 2012/5608; H04J 11/00; H04J 3/14; H04B 17/0012; H04B 17/028; H04B 7/2621; H04B 7/2045; H04B 7/208; H04W 72/0446; H04W 88/08
USPC .......... 370/203, 208, 249, 344, 319, 330, 334
See application file for complete search history.

(56) References Cited

U.S. PATENT DOCUMENTS 7,907,913 B2 * 3/2011 Lee et al. .......................... 455/69
8,023,457 B2 * 9/2011 Kotecha et al. ............... 370/329
(Continued)

OTHER PUBLICATIONS

Partial Supplementary European Search Report received for European Patent Application No. 09812114.8, mailed Nov. 27, 2014, 7 pages.
(Continued)

*Primary Examiner* — Brenda H Pham
(74) *Attorney, Agent, or Firm* — Kacvinsky Daisak Bluni PLLC (57) ABSTRACT

A MIMO beamforming method comprises receiving at a base station information regarding a difference between an ideal beamforming matrix and an averaged beamforming direction, using the information to construct a beamforming matrix at the base station, and performing a beamforming operation using the reconstructed beamforming matrix. Alternatively, the method comprises computing at a subscriber station an averaged beamforming direction, computing at the subscriber station a quantization index corresponding to a differential matrix in a differential codebook, and transmitting the quantization index across a wireless channel of the wireless network. The differential codebook may be constructed by identifying a codebook center and transforming a predefined codebook that is stored in a memory of a component of the wireless network.

18 Claims, 8 Drawing Sheets

(51) Int. Cl.
*H04B 7/04* (2006.01)
*H04W 16/28* (2009.01)

(56) References Cited

U.S. PATENT DOCUMENTS

| | | | |
|---|---|---|---|
| 8,134,503 B2* | 3/2012 | Na et al. | 342/370 |
| 2003/0218973 A1* | 11/2003 | Oprea et al. | 370/210 |
| 2005/0094373 A1* | 5/2005 | Weber et al. | 361/699 |
| 2006/0039489 A1* | 2/2006 | Ikram et al. | 375/260 |
| 2006/0092054 A1* | 5/2006 | Li et al. | 341/67 |
| 2006/0094373 A1 | 5/2006 | Hottinen | |
| 2006/0279460 A1* | 12/2006 | Yun et al. | 342/377 |
| 2007/0099578 A1* | 5/2007 | Adeney et al. | 455/69 |
| 2007/0195974 A1 | 8/2007 | Li et al. | |
| 2008/0080449 A1 | 4/2008 | Huang et al. | |
| 2008/0112500 A1 | 5/2008 | Pan et al. | |
| 2008/0304464 A1* | 12/2008 | Borkar et al. | 370/342 |
| 2009/0122884 A1* | 5/2009 | Vook et al. | 375/260 |

OTHER PUBLICATIONS

"Binary Differential Feedback Scheme for Downlink MIMO Precoding for E-UTRA", InterDigital Communications Corporation, 3GPP TSG RAN WG1 Meeting #48bis, R1-071465, Mar. 26-30, 2007, 11 pages (Author unknown).

Office Action received for U.S. Appl. No. 13/437,162, mailed Nov. 17, 2014, 14 pages.

Extended European Search Report received for European Patent Application No. 15161113.4, mailed Jul. 23, 2015, 7 pages.

* cited by examiner

MIMO BEAMFORMING METHOD AND METHOD OF CONSTRUCTING A DIFFERENTIAL CODEBOOK FOR A WIRELESS NETWORK

CLAIM OF PRIORITY

This application is a continuation of U.S. patent application Ser. No. 13/437,162 filed Apr. 2, 2012, a divisional of U.S. patent application Ser. No. 12/584,142, now U.S. Pat. No. 8,149,791, which was filed on Sep. 1, 2009 and which claims the benefit of priority under 35 U.S.C. §119(e) to U.S. Provisional Patent Application Ser. No. 61/093,699, filed Sep. 2, 2008 (all of which are incorporated herein by reference in their entirety).

FIELD OF THE INVENTION

The disclosed embodiments of the invention relate generally to wireless communications, and relate more particularly to beamforming in wireless communication networks.

BACKGROUND OF THE INVENTION

In closed-loop multiple input, multiple output (MIMO) beamforming in a wireless network comprising a subscriber station and a base station, the subscriber station (also referred to at times herein as a mobile device) quantizes the ideal beamforming matrix and sends a quantization index corresponding to the ideal beamforming matrix back to the base station. The base station reconstructs the beamforming matrix according to the fed-back index and conducts the beamforming. It is well known that beamforming increases the link performance and system throughput.

Embodiments of the invention may find application in a wireless local area network (WLAN) or a wireless Metropolitan area network (WMAN) including a WiMAX (Worldwide Interoperability for Microwave Access) network or the like. WiMAX technology is based on the IEEE 802.16 family of standards, including IEEE 802.16e and others.

BRIEF DESCRIPTION OF THE DRAWINGS

The disclosed embodiments will be better understood from a reading of the following detailed description, taken in conjunction with the accompanying figures in the drawings in which.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements, while similar reference numerals may, but do not necessarily, denote similar elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

DETAILED DESCRIPTION OF THE DRAWINGS

In one embodiment of the invention, a MIMO beamforming method is performed at a base station of a wireless network. The base station comprises a transmitting antenna. In one embodiment, the method comprises receiving at the base station information regarding a difference between an ideal beamforming matrix and an averaged beamforming direction, using the information to construct a reconstructed beamforming matrix at the base station, and performing a beamforming operation on the transmitting antenna using the reconstructed beamforming matrix. In other embodiments, the MIMO beamforming method is performed at a subscriber station of the wireless network. In one such embodiment, the method comprises computing at the subscriber station an averaged beamforming direction, computing at the subscriber station a quantization index corresponding to a differential matrix in a differential codebook, wherein the differential matrix rotates the averaged beamforming direction, and transmitting the quantization index across a wireless channel of the wireless network. In either embodiment, or in other embodiments, the differential codebook may be constructed by identifying a codebook center and transforming a predefined codebook that is stored in a memory of a component of the wireless network.

Embodiments of the invention make use of a differential feedback scheme in order to reduce the feedback overhead and increase beamforming accuracy. There exists correlation in the beamforming matrixes across space, frequency, and time, and the correlation implies overlapping or redundancy in the feedback. The differential feedback scheme exploits this correlation by only feeding back the difference with respect to some reference—the averaged beamforming direction, for example—which is computed from long term channel state information, wideband channel state information, the previous short term feedback, or the like.

It should be understood that the averaged beamforming direction may slowly vary. The averaging computation may, for example, be performed over a window of samples (of quantized beamforming direction). In addition, a weight vector may be applied over the samples in order to compute the average. For example, the previously quantized and fed-back L beamforming directions are $\hat{v}(k+1) \ldots v(k+L)$. The weight vector is $w_1 \ldots w_L$. The averaged beamforming direction for time k+L+1 is computed as $\bar{v}(k+L+1) = \text{orth}(w_1 \hat{v}(k+1) + \ldots w_L \hat{v}(k+L))$ or $\bar{v}(k+L+1) = w_1 \hat{v}(k+1) + \ldots w_L \hat{v}(k+L)$, where the orthogonalization and normalization operation, orth(X), converts matrix (or vector) X to a unitary or orthogonal matrix Y whose columns span the same subspace as X's columns do. As an example, the operation orth(X) can be implemented by Grant-Schmidt orthogonalization. A unitary matrix consists of columns that are orthogonal to each other and have unit norm. In addition, the number of rows can be different from the number of columns in a unitary matrix. The averaged beamforming direction can also be computed recursively using the previous averaged beamforming directions and the previous fed-back beamforming directions. For example, one more term, $w_0 \bar{v}(k+L)$, can be added to the previous two equations, yielding $\bar{v}(k+L+1) = \text{orth}(w_0 \bar{v}(k+L) + w_1 \hat{v}(k+1) + \ldots w_L \hat{v}(k+L)$ or $\bar{v}(k+L+1) = w_0 \bar{v}(k+L) 30 w_1 \hat{v}(k+1) + \ldots w_L \hat{v}(k+L)$. Since the previously fed-back beamforming directions $\hat{v}(k+1) \ldots \hat{v}(k+L)$ instead of the un-quantized, ideal beamforming directions are known at both the transmitter and receiver, the (moving) average can be computed at both sides simultaneously. The weight vector can be updated according to the previously fed-back beamforming directions or can just be a set of constant coefficients. The magnitudes of the coefficients can be the same, for simplicity, or can decrease as the index $l=1, \ldots, L$ for $w_l$. Furthermore, the moving average (k+l+1) can be treated as the prediction of the ideal beamforming direction for time k+L+1 using all the previous feedbacks, i.e., $\hat{v}(t)$s, $t<k+L+1$. The difference between the ideal beamforming direction and the prediction, i.e., $v(k+L+1) - \bar{v}(k+L+1)$, is unknown to the transmitter and needs to be fed back. In such a case, the weight vector is the prediction filter that may be a Wiener filter. Note that in the special case of $L=w_1=1$, the scheme falls back to the conventional differential feedback that uses only the previous feedback as a reference.

Embodiments of the invention construct a differential codebook through the transformation of an 802.16e codebook. The transformation provides backward compatibility to 802.16e and enables the codebook to adapt to various channel scenarios. Additionally, embodiments of the invention adapt the differential codebook to MIMO configuration and mobile speed.

Figure 1:
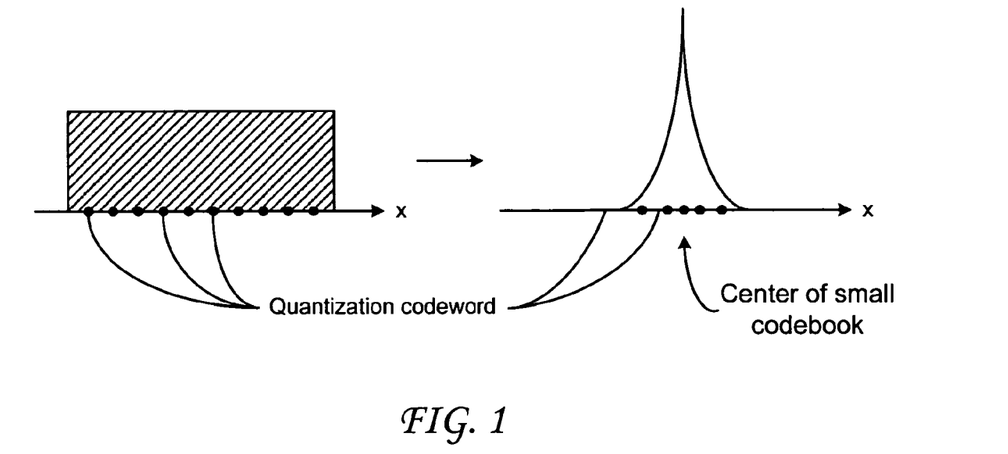
FIG. 1 is a schematic illustration of quantizer input distribution and codeword distribution according to an embodiment of the invention.

The differential feedback scheme according to an embodiment of the invention is illustrated in FIG. 1. The input to the quantizer is the ideal beamforming matrix. If there is no correlation, the input is widely spread in the entire quantization space, as shown on the left-hand side of FIG. 1. In contrast, if there is high correlation the input is limited to a small subspace and a few quantization codewords are sufficient, as shown on the right-hand side of FIG. 1.

In a high-correlation case such as that described above, the center of the subspace needs to be identified and fed back to the transmitter and a small codebook with a suitable size (in terms of codeword number and effective coverage range) needs to be constructed to cover the subspace. These activities will be described in more detail below.

System Model

The assumed system model is $$y = H\hat{V} + n \quad (1)$$

where n is the complex additive white Gaussian noise (AWGN) with variance $N_0$, s is the $N_s$ by 1 transmitted vector with unit power, $N_s$ is the number of spatial streams, y is the received vector, H is the channel vector of size $N_r$ by $N_t$, and $\hat{V}$ is the beamforming matrix (or vector) of size $N_t$ by $N_s$. The correlated channel matrix H is generated from the channel matrix $H_w$ with independent, identically distributed (i.i.d.) entries as $$H = R_r^{1/2} H_w R_t^{1/2}, \quad (2)$$

where $R_r$ is the $N_r$ by $N_r$ receive covariance matrix and $R_t$ is the $N_t$ by $N_t$ transmit covariance matrix measured at the subscriber station. The covariance (or correlation) matrix $R_t$ contains the averaged directions for beamforming.

Denote the eigenvalue decomposition of $R_t$ as $R_t = Q\Sigma^2 Q^H$, where Q is an $N_t$ by $N_t$ unitary matrix (i.e., $Q^H Q = I$) and $\Sigma$ is the diagonal matrix with the square roots of the eigenvalues $\sigma_i$ for $i=1, \ldots, N_t$ in decreasing order $\sigma_i \geq \sigma_{i+1}$.

Space Domain Differentiation

Figure 2:
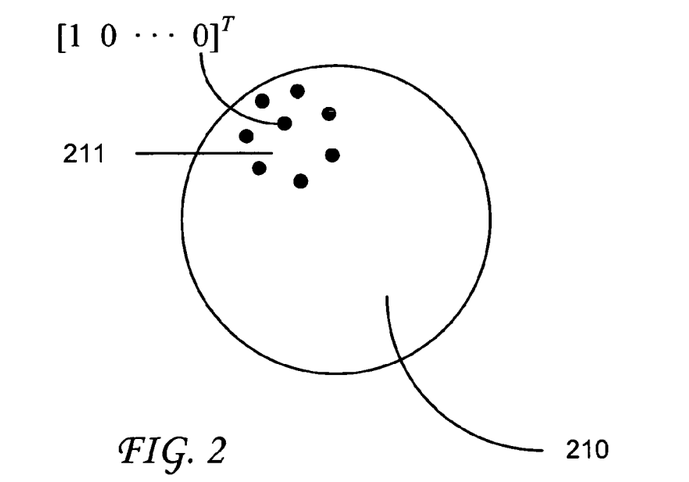
FIG. 2 is a schematic representation of a quantization space with polar cap according to an embodiment of the invention.

It may be noted here that the ideal beamforming matrix has its distribution peak at the principal subspace spanned by the columns of Q, where the principal subspace corresponds to the large eigenvalues of $\Sigma$. The ideal beamforming matrix concentrates on the principal subspace with a higher and higher probability as the correlation increases. This implies that a localized codebook around the principal subspace is enough for the quantization. The simplified codebook has two components: codebook center and polar cap. The codebook center is the principal subspace spanned by the columns of Q. The polar cap is a codebook that only covers a small portion of the quantization space of the 802.16e codebook as shown in FIG. 2 for the vector case. As illustrated in FIG. 2, a full quantization space 210 includes a polar cap 211 with a center vector codeword denoted as $[1 \ 0 \ldots 0]^T$.

It should be noted that the concept of principal subspace may not be needed if the ideal beamforming matrix doesn't need to be square. Take, for example, an embodiment in which the system has four transmit antennas and two receive antennas. The ideal beamforming matrix may then be thought of as 4×4. However, the ideal beamforming matrix may alternatively be thought of as 4×1 or 4×2 if one or two spatial stream(s) is sent. The subspace of the latter 4×1 or 4×2 matrix that corresponds to the principal singular value of the channel matrix is referred to as the principal subspace of the former 4×4 matrix.

For quantization, the subscriber station first rotates the center of the polar cap to the principal subspace of Q and then computes and quantizes the difference (called a differential matrix (denoted herein by D)) between the ideal beamforming matrix and the principal subspace. Equivalently, the subscriber station may first remove the principal subspace from the ideal beamforming matrix and then quantize the remaining matrix using the polar cap codebook. The base station receives the quantization index and adds the differential matrix to the quantized principal subspace for reconstructing the beamforming matrix.

Let $$\hat{Q} = [\hat{Q}_1 \ \hat{Q}_2], \quad (3)$$

where Q is the quantized Q, $\hat{Q}_1$ is $N_t \times N_s$ and is the quantized, principal subspace for beamforming, $N_t$ and $N_s$ are, respectively, the number of transmit antennas and the number of spatial streams, and $\hat{Q}_2$ is $N_t \times (N_t - N_s)$, with the complementary columns orthogonal to $\hat{Q}_1$. It should be noted that $\hat{Q}_1$ is the averaged beamforming direction in unitary or orthogonal matrix format, which is computed from the previous (quantized) feedbacks. In one embodiment, the operations of beamforming, quantization, and reconstruction are written as:

Differential at Subscriber Station:

$$D = [\hat{Q}_1 \ \hat{Q}_3]^H V. \quad (4)$$

Quantization at Subscriber Station:

$$\hat{D} = \underset{D_i \in C_p}{\mathrm{argmax}} \|D^H D_i\|_F. \quad (5)$$

Beamforming Matrix Reconstruction at Base Station:

$$\hat{V} = [\hat{Q}_1 \ \hat{Q}_3]\hat{D}, \quad (6)$$

Beamforming at Base Station:

$$y = H\hat{V}s + n. \quad (7)$$

In (4), the $N_t \times N_s$ V is the ideal beamforming matrix and $\hat{Q}_3$ consists of a set of complementary columns orthogonal to $\hat{Q}_1$ and can be different from $\hat{Q}_2$ by an $N_s \times N_s$ rotation. In other words, $\hat{Q}_w{}^H \hat{Q}_3$ is an $N_s \times N_s$ unitary matrix. $\hat{Q}_3$ can be computed from $\hat{Q}_1$ using Householder reflection or the like so that the subscriber station doesn't need to estimate $\hat{Q}_2$ hidden in the channel samples. $\hat{Q}_1$ is the center of a rotated differential codebook, and is a cumulative quantity that is built up from all previous feedbacks sequentially (i.e., the $\hat{D}$s). $\hat{D}$ is an $N_t$ by $N_s$ orthogonal matrix. This is a quantity that needs to be transmitted to the base station by the subscriber station.

Because the ideal D is a continuous quantity, the subscriber station needs a discrete codebook to quantize the continuous D and send back the index of the selected codeword in the codebook. The codewords, which spread in a small scope as shown in FIG. 2, comprise the quantization codebook. The codewords are indexed as 0, 1, 2, . . . , $N_{cw}$, for example. Each codeword is a different $N_t$ by $N_s$ orthogonal matrix. The subscriber station selects one of the $N_{cw}$ matrices and sends back the index of the selected matrix. For example, suppose the first matrix is $D_1 = [1\ 0\ 0\ 0; 0\ 1\ 0\ 0]^T$ and the subscriber station believes this matrix gives the best performance for the next beamforming among all $N_{cw}$ codewords in the codebook. In other words, substitution of $D_1$ for $\hat{D}$ in (6) gives the best performance for $\hat{V}$ in the beamformed channel of (7). Then the subscriber station would send the index "1" through the feedback channel to the base station.

Figure 3:
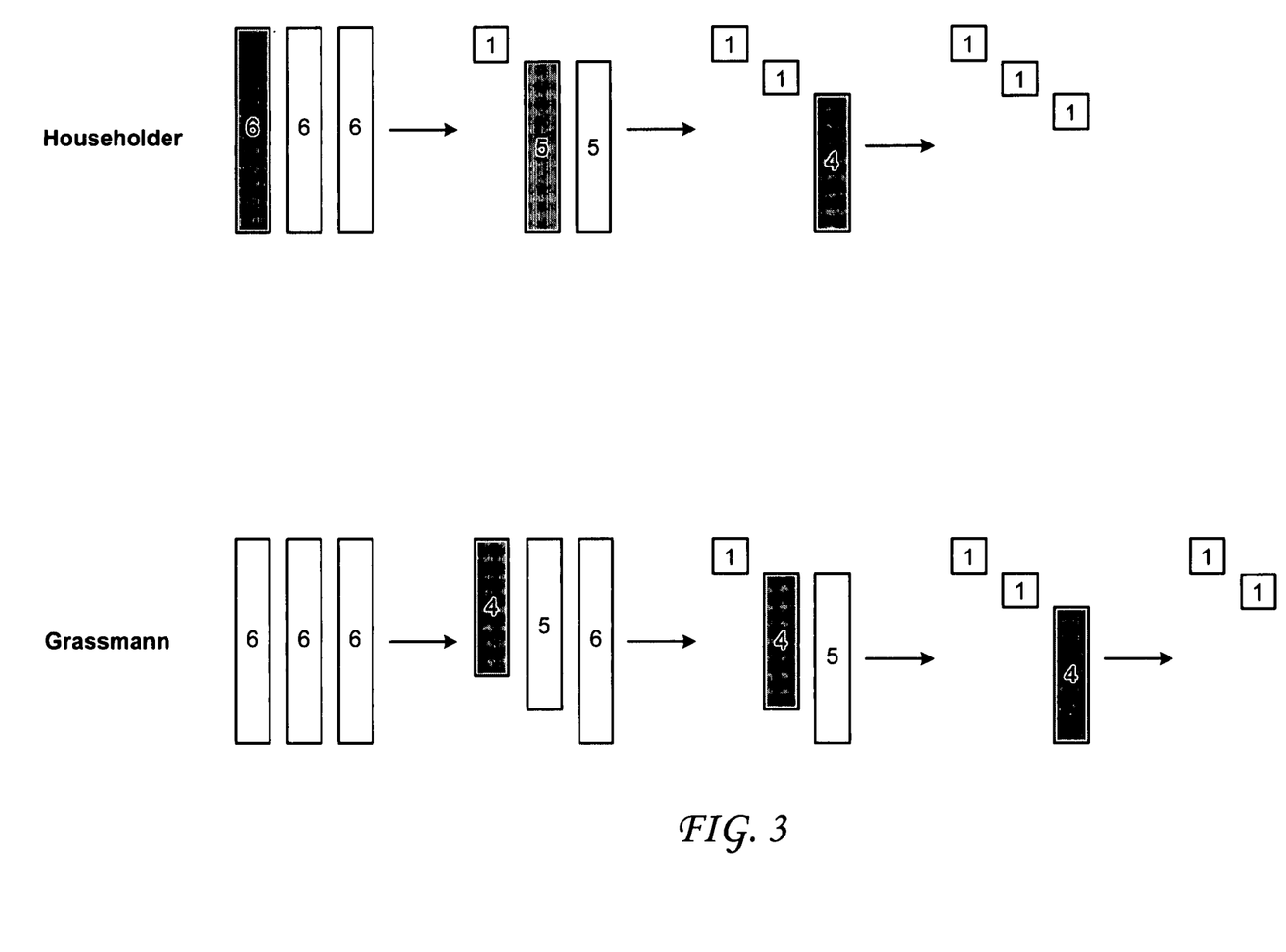
FIG. 3 is an illustration of the decomposition of a unitary matrix into unit vectors according to an embodiment of the invention.

$\hat{Q}_1$ is fed back by the subscriber station. Based on the same $\hat{Q}_q$, both the subscriber station and the base station generate the same $\hat{Q}_3$ using the same method. In (5), $D_i$ is the $i^{th}$ codeword matrix of the polar cap codebook denoted by $C_p$. In one embodiment, the quantization criterion may maximize the received signal power. In other embodiments, other criteria such as channel capacity or mean squared error (MSE) may be used. As an alternative, since D is unitary it may be decomposed first following which quantization may be conducted on the decomposed components (e.g., unit vectors). (An illustration of decomposing a unitary matrix into unit vectors is shown in FIG. 3.) In (7), $\hat{V}$ is the $N_t \times N_s$ reconstructed beamforming matrix, s is the $N_s \times 1$ data vector, and H is the channel matrix with transmit antenna correlation $R_t$.

Figure 4:
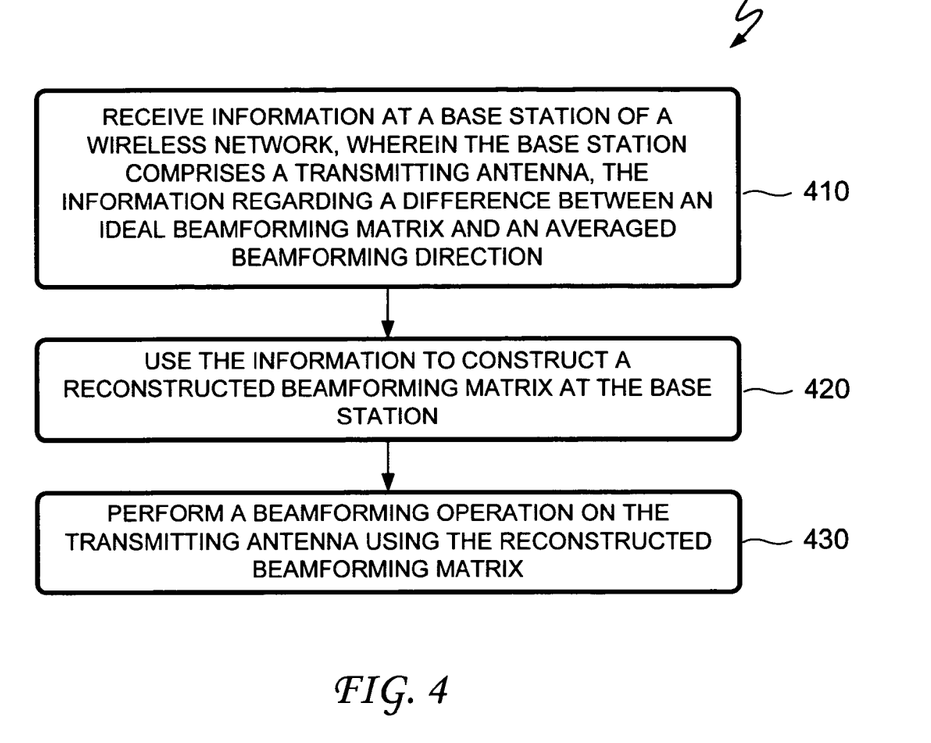
FIGS. 4-7 are flowcharts illustrating MIMO beamforming methods according to various embodiments of the invention.

FIG. 4 is a flowchart illustrating a MIMO beamforming method 400 according to an embodiment of the invention.

A step 410 of method 400 is to receive information at a base station of a wireless network, wherein the base station comprises a transmitting antenna, the information regarding a difference between an ideal beamforming matrix and an averaged beamforming direction. In one embodiment, the difference between the ideal beamforming matrix and the averaged beamforming direction is represented by a differential matrix, and step 410 comprises receiving a quantization index corresponding to a quantized version of the differential matrix. In at least one embodiment, the quantized version of the differential matrix is an orthogonal matrix, and in a particular embodiment the quantized version of the differential matrix is an $N_t \times N_s$ orthogonal matrix.

A step 420 of method 400 is to use the information to construct a reconstructed beamforming matrix at the base station.

A step 430 of method 400 is to perform a beamforming operation on the transmitting antenna using the reconstructed beamforming matrix. In one embodiment, step 430 may comprise weighting an input to the transmitting antenna. In another embodiment, step 430 may comprise steering a beam transmitted by the transmitting antenna.

Figure 5:
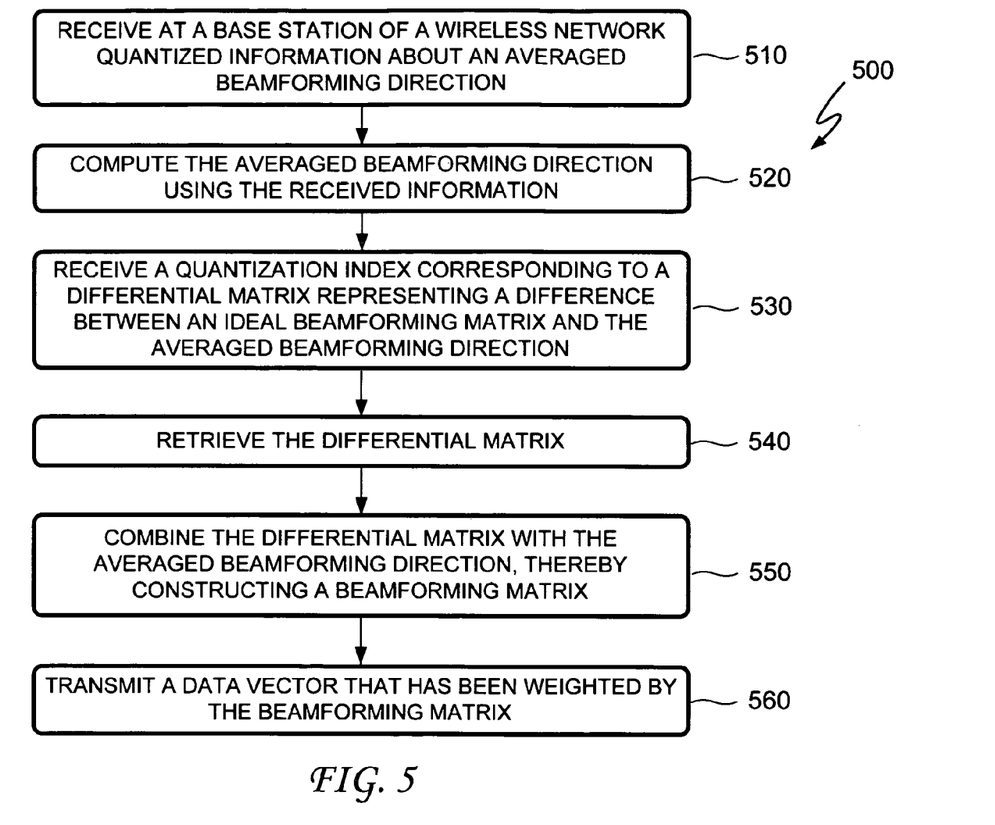

FIG. 5 is a flowchart illustrating a MIMO beamforming method 500 according to another embodiment of the invention.

A step 510 of method 500 is to receive at a base station of a wireless network quantized information about an averaged beamforming direction. A step 520 of method 500 is to compute the averaged beamforming direction using the received information.

A step 530 of method 500 is to receive a quantization index corresponding to a differential matrix representing a difference between an ideal beamforming matrix and the averaged beamforming direction.

A step 540 of method 500 is to retrieve the differential matrix. In one embodiment, step 540 comprises generating a differential codebook and then selecting the differential matrix from the generated differential codebook. As an example, generating the differential codebook can comprise performing a transform on a pre-defined non-differential or uniform codebook, such as the uniform 802.16e codebook, that is stored in a memory device at the base station.

A step 550 of method 500 is to combine the differential matrix with the averaged beamforming direction, thereby constructing a beamforming matrix. In one embodiment, step 550 comprises generating a second matrix (e.g., $\hat{Q}_3$) comprising a set of complementary columns orthogonal to the averaged beamforming direction and combining the differential matrix with the second matrix as well as with the averaged beamforming direction. As an example, this may be equivalent to finding a value for $\hat{V}$ according to (6).

A step 560 of method 500 is to transmit a data vector that has been weighted by the beamforming matrix.

Figure 6:
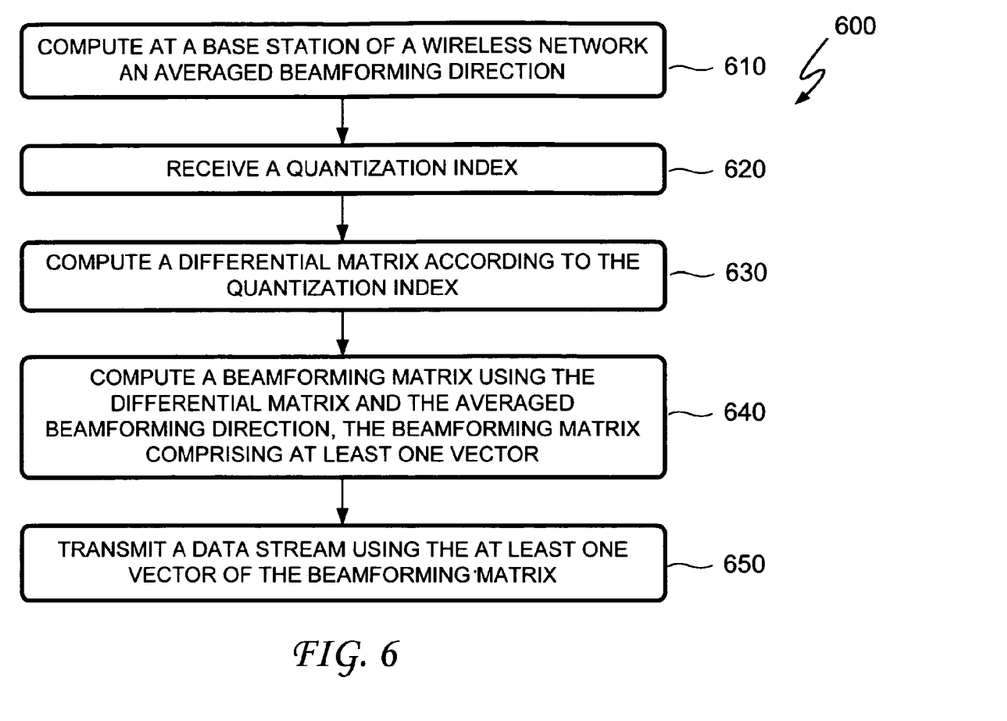

FIG. 6 is a flowchart illustrating a MIMO beamforming method 600 according to yet another embodiment of the invention.

A step 610 of method 600 is to compute at a base station of a wireless network an averaged beamforming direction.

A step 620 of method 600 is to receive a quantization index.

A step 630 of method 600 is to compute a differential matrix according to the quantization index.

A step 640 of method 600 is to compute a beamforming matrix using the differential matrix and the averaged beamforming direction, the beamforming matrix comprising at least one vector. In one embodiment, step 640 comprises multiplying the differential matrix by a matrix that is computed from the averaged beamforming direction.

A step 650 of method 600 is to transmit a data stream using the at least one vector of the beamforming matrix. It should be noted that the beamforming matrix can be degraded to a beamforming vector for a single stream transmission. In this case, the feedback index may be referred to as a differential vector codebook.

Figure 7:
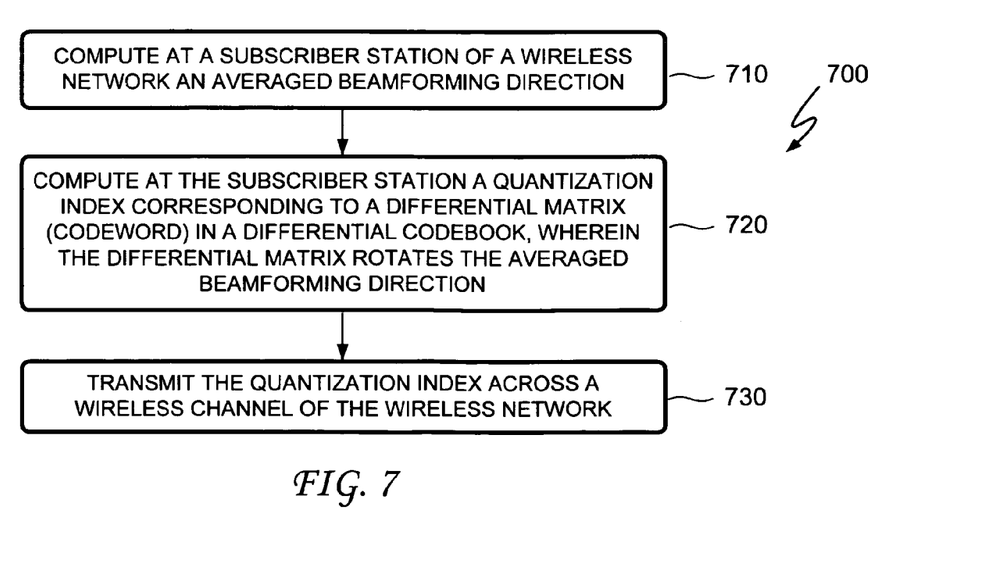

FIG. 7 is a flowchart illustrating a MIMO beamforming method 700 according to still another embodiment of the invention.

A step 710 of method 700 is to compute at a subscriber station of a wireless network an averaged beamforming direction. As an example, the computation may be conducted using the previous fed back information so that both the transmitter and the receiver can generate the same averaged beamforming direction.

A step 720 of method 700 is to compute at the subscriber station a quantization index corresponding to a differential matrix (codeword) in a differential codebook, wherein the differential matrix rotates the averaged beamforming direction. In one embodiment, step 720 comprises computing a differential matrix representing a difference between an ideal beamforming matrix and the averaged beamforming direction and then quantizing the differential matrix. As an example, computing the differential matrix may be equivalent to finding a solution for D according to (4). As another example, quantizing the differential matrix may be equivalent to finding a value of $D_i$ that yields a maximum value of $\|D^H D_i\|_F$, where $D_i$ is a codeword matrix of the differential codebook—in other words, comprises solving (5).

The differential matrix represents the difference between the ideal beamforming matrix and the averaged beamforming direction. The differential matrix does not necessarily need to be explicitly computed at the subscriber station in order to arrive at the quantization index because the fed-back quantization index corresponds to a differential matrix in the quantization codebook. Each differential matrix can rotate the reference beamforming direction (i.e., the averaged or the previous beamforming direction) by some small amount.

In one embodiment, the subscriber station adaptively changes the differential codebook according to a state of the wireless channel. For instance, the span or range of the codebook can be smaller for slow fading and larger for fast fading. An example that uses an antenna correlation matrix to adaptively change the differential codebook is given below in the polar cap codebook discussion.

A step 730 of method 700 is to transmit the quantization index across a wireless channel of the wireless network.

The quantization of $Q_1$ and the computation of $\hat{Q}_3$ will now be illustrated by an example with a 4×2 $Q_1$. Denote the two columns of $Q_1$ as $Q_1=[p\ q]$. Note that p can be quantized by the 4×1 6-bit codebook of 802.16e. Denote the quantized p as $\hat{p}$. The 4×1 q is converted to a 3×1 $\tilde{q}$ by a Householder operation defined in the 802.16e standard as $$\Phi_{\hat{p}} Q_1 = \begin{bmatrix} 0.9x & 0.0 \\ 0.1x & 0.0 \\ 0.0 & \tilde{q} \\ 0.0 & \end{bmatrix}, \quad (8)$$

$$\text{where } \Phi_x = I - \frac{2}{\|w\|^2} w w^H \text{ and } w = x - e_1 = \begin{bmatrix} x_1 - 1 \\ x_2 \\ x_3 \\ x_4 \end{bmatrix}.$$

Then $\tilde{q}$ is quantized by the 3×1 6-bit codebook of 802.16e. Denote the quantized p and $\tilde{q}$ as $\hat{p}$ and $\hat{q}$. The quantized version of $[Q_1\ Q_3]$, which is actually used by both the base station and the subscriber station for the beamforming computation, is computed as $$[\hat{Q}_1\ \hat{Q}_3] = \Phi_{\hat{p}} \begin{bmatrix} 1 & 0 & 0 & 0 \\ 0 & & & \\ 0 & & \Phi_{\hat{q}} & \\ 0 & & & \end{bmatrix}. \quad (9)$$

Polar Cap Codebook

Figure 8:
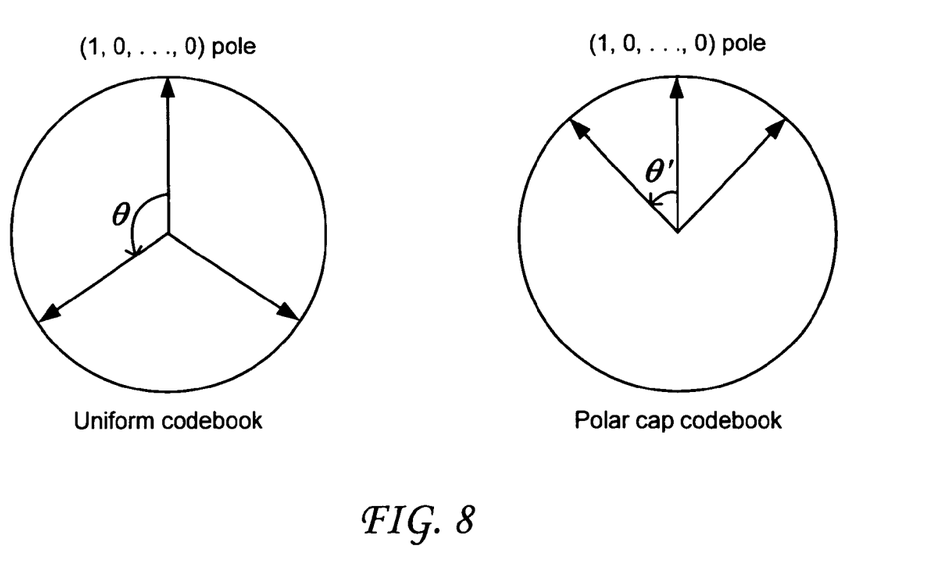
FIG. 8 is an illustration of the generation of a polar cap codebook by codeword concentration according to an embodiment of the invention.

The polar cap concept has been used to generate hierarchical codebooks. For backward compatibility, the polar cap codebooks can be generated from a uniform 802.16e codebook. The transformation from the uniform 802.16e codebook to a polar cap codebook reduces the chordal distance between each codeword and the matrix $$\begin{bmatrix} 1 & & \\ & \ddots & \\ & & 1 \end{bmatrix}$$

as illustrated in FIG. 8. Note that each 3-bit vector codebook and some other codebooks of 802.16e have the codeword $$\begin{bmatrix} 1 & & \\ & \ddots & \\ & & 1 \end{bmatrix}.$$

The transformation is $$\tilde{V}_i = \text{orth}(\Lambda_\rho V_i), \text{ where } \Lambda_\rho = \begin{bmatrix} \lambda_1(\rho) & & \\ & \ddots & \\ & & \lambda_{N_t}(\rho) \end{bmatrix} \quad (10)$$

is the diagonal matrix for correlation scenario $\rho$ and orth(X) converts the input matrix (or vector) X to an orthogonal matrix with orthonormal column(s) that span the same subspace as X's columns. Note that orth(X) is essentially the orthogonalization of X's columns and can be simply implemented by a Grant-Schmidt operation. We predefine $N_\rho$, say 4, scenarios and pre-compute $\Lambda_\rho$ for each scenario. For example, $$\Lambda_{0.95} = \begin{bmatrix} 1.94 & & & \\ & 0.40 & & \\ & & 0.23 & \\ & & & 0.17 \end{bmatrix}$$

for 0.5 wavelength antenna spacing. For another example, $\Lambda_0$ is the identity matrix. Namely, the no transformation is conducted on the uniform (802.16e) codebook and the polar cap is opened to the maximum aperture. The subscriber station selects a suitable size of polar cap by sending the index of $\rho$ according to MIMO configuration, e.g., $N_r$, $N_t$, $N_s$, antenna correlation, and mobile speed. After the subscriber station feeds back the index of the selected $\rho$, e.g., using two bits, both the base station and the subscriber station can generate the same polar cap codebook.

Figure 9:
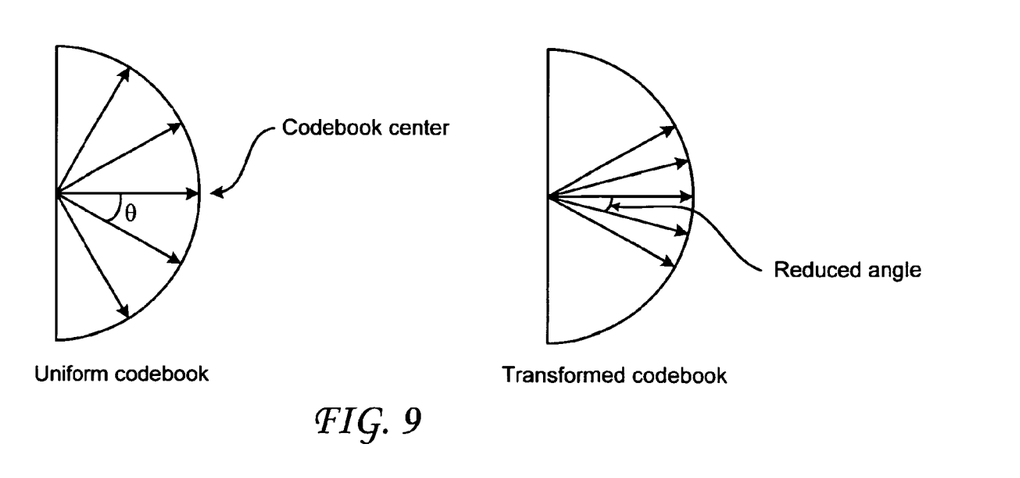
FIG. 9 in an illustration of the reduced chordal distance between vectors or subspaces according to an embodiment of the invention.

An alternative procedure for polar cap generation will now be described. Since the dedicated codebooks for quantizing the decomposed vectors require additional storage complexities it may be advantageous to generate the quantization codebooks from 802.16e vector codebooks. The codewords of the 802.16e vector codebooks uniformly distribute on a sphere and we would like to make them concentrate around one codeword, e.g., $[1\ 0 \ldots 0]^T$ (as shown in FIG. 9) which indeed exists in each 802.16e 3-bit vector codebook. It turns out that the 3-bit codebooks are sufficient for differential applications. If $[1\ 0 \ldots 0]^T$ doesn't exist in the 802.16e codebook, we can pick one codeword and rotate the entire codebook so that the selected codeword becomes $[1\ 0 \ldots 0]^T$ using Householder reflection or other methods. For codeword concentration, a simple way is to reduce the angle between the center vector and any of the other vectors. Let $e_1 = [1\ 0 \ldots 0]^T$ be the vector picked as codebook center and v be another vector codeword in the codebook. Then, the angle between $e_1$ and v is $\theta = \arccos(\|v_1\|)$, where $v_1$ is the first entry of v and $v_1 = e_1^H v$. We would like to change, or more precisely, reduce $\theta$. The transformation may be $$\tilde{v}_1 = \rho v_1,$$

$$\tilde{v}_i = \sqrt{\frac{1-\rho^2 \|v_1\|^2}{1-\|v_1\|^2}}\, v_i, \text{ for } i = 2, 3, \ldots$$

where $\rho$ is some positive number greater than one and is dependent on the correlations and mobile speed, $v_i$ is the $i^{th}$ entry of v, and $\tilde{v}_i$ is the $i^{th}$ entry of the transformed vector. Since $v_i$ is real and positive in the 3-bit codebooks of 802.16e, the norm operation in the three expressions above can be skipped for transforming 3-bit codebooks. To reduce implementation complexities, codebooks for several distinct values of $\rho$ can be generated beforehand and stored at the mobile device. In operation mode, the mobile device selects the $\rho$ and feeds back the index of the selected $\rho$. Additionally, the mobile device synthesizes the differential codebook from the stored vector codebook corresponding to the selected $\rho$. Since only the vector codebook is stored, the storage complexity is relatively low.

Figure 10:
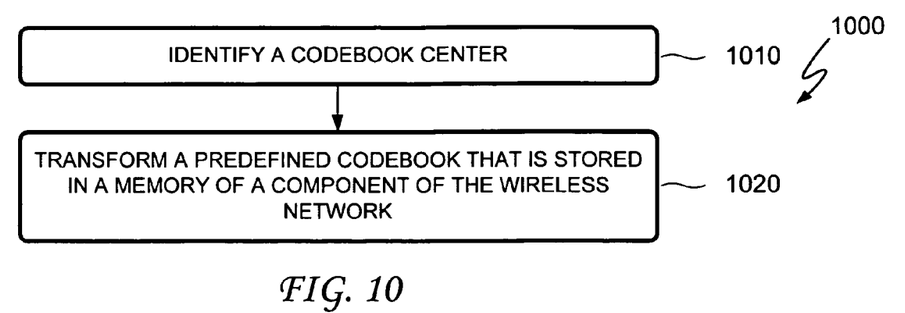
FIG. 10 is a flowchart illustrating a method of constructing a differential codebook for a wireless network according to an embodiment of the invention.

FIG. 10 is a flowchart illustrating a method 1000 of constructing a differential codebook for a wireless network according to an embodiment of the invention.

A step 1010 of method 1000 is to identify a codebook center. In one embodiment, step 1010 comprises defining a principal subspace spanned by columns of a unitary matrix, the principal subspace corresponding to an averaged beamforming direction. In a particular embodiment, the unitary matrix has a number of rows and a number of columns both equal to a number of transmit antennas of the wireless network. It should be mentioned here that equations (3)-(6) above (and equations (11)-(13) below) are for a differential codebook with the first $N_s$ columns of identity matrix as the codebook center, where $N_s$ is the number of data streams. If the differential codebook is already centered around the averaged beamforming direction then the operations in (3)-(6) and (11)-(13) are not needed. In that case, the receiver directly searches the differential codebook for the best $\hat{V}$ in (7) and $\hat{V}(t)$ in (14) for the transmitter.

A step 1020 of method 1000 is to transform a predefined codebook that is stored in a memory of a component of the wireless network. In one embodiment the predefined codebook is a vector codebook comprising a plurality of vector codewords uniformly distributed on a sphere, and step 1020 comprises selecting one of the vector codewords to be a center vector of the differential codebook and manipulating the predefined codebook such that the plurality of vector codewords concentrate around the center vector. As an example, manipulating the predefined codebook can comprise reducing an angle between the center vector and any other one of the plurality of vector codewords. In one embodiment, method 1000 further comprises rotating the predefined codebook, e.g., using Householder reflection or other methods.

Time/Frequency Domain Differentiation

As mentioned above, there exist strong correlations between beamforming matrixes in adjacent frequencies and frames, and this correlation can be exploited to reduce feedback overhead. We take the example of time domain correlation to depict the differential feedback scheme. It is the same as the polar cap scheme depicted above except that $\hat{Q}_1$ is replaced by the fed back beamforming matrix for the previous frame.

Differential at Subscriber Station:

$$D = [\hat{V}(t-1)V\hat{V}^\perp(t-1)]^H V(t). \quad (11)$$

Quantization at Subscriber Station:

$$D = \underset{D_i \in C_d}{\arg\max} \|D^H D_i\|_F. \quad (12)$$

Beamforming Matrix Reconstruction at Base Station:

$$\hat{V}(t) = [\hat{V}(t-1)\hat{V}^\perp(t-1)]\hat{D}. \quad (13)$$

Beamforming at Base Station:

$$y = H\hat{V}(t)s + n. \quad (14)$$

In (11), the $N_t \times N_s$ V(t) and $\hat{V}(t)$ are, respectively, the ideal and quantized beamforming matrixes for frame t and $\hat{V}^\perp(t-1)$ has the complementary columns orthogonal to $\hat{V}(t-1)$ and can be computed from $\hat{V}(t-1)$ by a Householder operation as in (9). In (12), $D_i$ is the codeword matrix of the differential codebook denoted by $C_d$ and the quantization criterion maximizes the received signal power (although, as above, other criteria such as channel capacity or MSE can be also used).

The polar cap codebook can be used as the differential codebook for backward compatibility. An alternative to the transformation approach given in (10) is as follows. In order to lower the computational complexity, we concatenate polar cap vector codebook to build polar cap matrix codebook without the orth( ) operation. The concatenation operation is the Householder operation defined in the 802.16e standard. Let $C_d(m, 1)$ denote the polar cap codebook for m×1 whose codewords are $v_i$ for i=1, 2, ..., $N_m$. The polar cap codebook for (m×1)×2 matrix denoted by $C_d(m+1,2)$ is generated by $$V(i, j) = \begin{bmatrix} & & 0 \\ & \Phi_{v_i} & 0 \\ & & 0 \\ 0 & 0 & 0 & 1 \end{bmatrix} \begin{bmatrix} 1 & 0 \\ 0 & \\ 0 & v_j \\ 0 & \end{bmatrix}, \quad (15)$$

where V(i, j) is the codeword of $C_d(m+1,2)$ for i, j=1, 2, ..., $N_m$ and $\Phi_{v_i}$ is the m×n Householder matrix of $v_i$ defined in the 802.16e standard. Note that if the system only has four transmit antennas, the 4×3 beamforming matrix may be represented by the complementary 4×1 vector orthogonal to the beamforming matrix and the polar cap vector codebook may be used directly without concatenation.

Simulation Results

Figure 11:
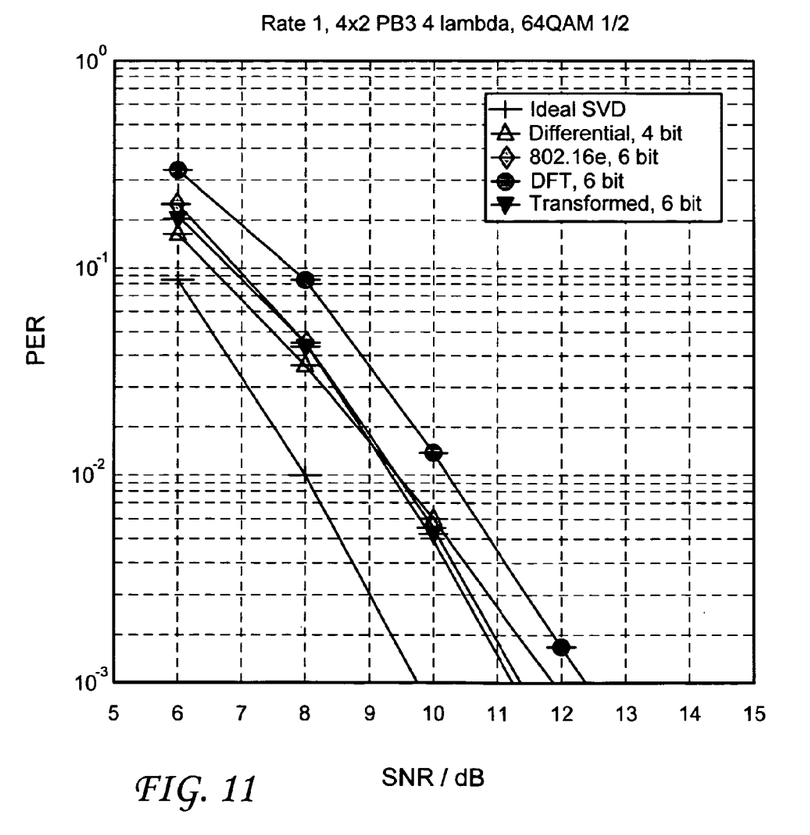
FIGS. 11-13 illustrate link level simulation results according to embodiments of the invention.
Figure 12:
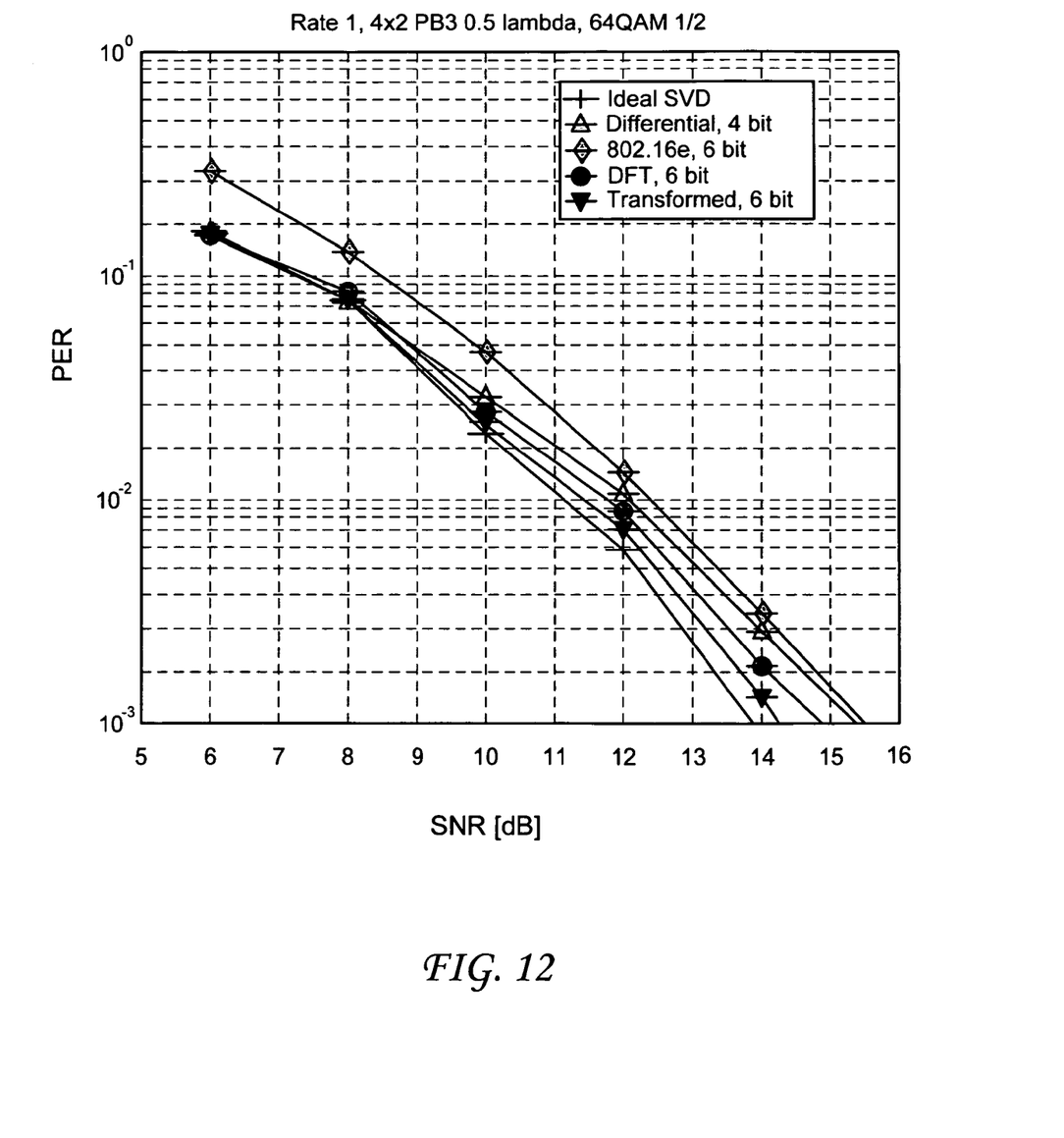
Figure 13:
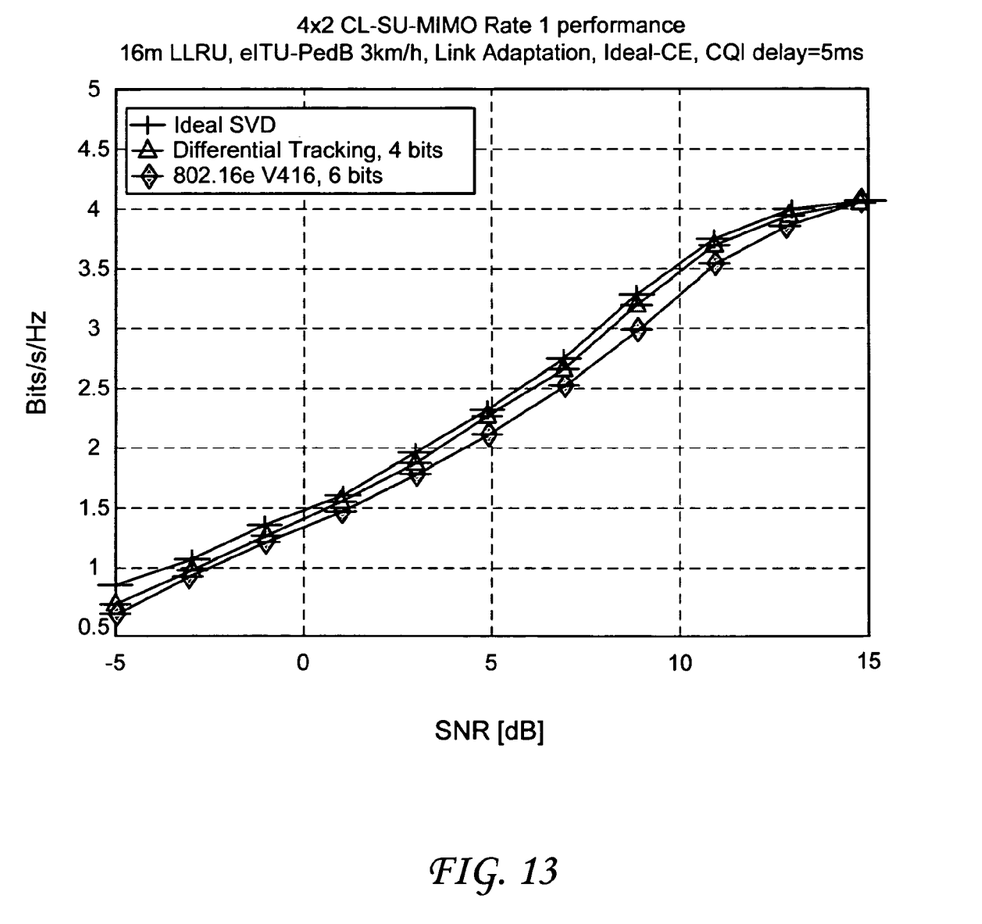

FIGS. 11-13 illustrate link level results according to embodiments of the invention. FIG. 11 and FIG. 13 show results for a low correlation case and FIG. 12 shows results for a high correlation case. The channel model is ITU Pedestrian B. The base station has four transmit antennas and the subscriber station has two receive antennas. The antenna spacings of the base station transmit antennas are four wavelengths and 0.5 wavelength for practical mounting with low and high correlations. One data stream is transmitted. Modulation and code rate are 64 QAM and 0.5. Test results for four codebooks are shown: (1) the conventional 802.16e codebook; (2) the DFT codebook; (3) Intel's transformed codebook; and (4) the differential codebook according to an embodiment of the invention. The DFT codebook is proposed by Samsung to 802.16m.

For both low and high correlation cases, the differential codebook according to embodiments of the invention achieves almost the same performance as the transformed codebook, which has the best quantization performance. For the same performance, the differential codebook uses 4-bit feedback while the other codebooks use 6-bit feedback. Therefore, the differential codebook according to embodiments of the invention reduces complexity by 50 percent and still achieves the same quantization performance. The overhead of the 4-bit differential is 50 percent less because (6 bits−4 bits)/6 bits=50 percent. The throughput comparison in FIG. 13 demonstrates that the differential codebook according to embodiments of the invention outperforms the legacy 802.16e codebook by 0.8 dB of signal to noise ratio (SNR) and 50 percent of overhead.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the MIMO beamforming methods and the related structures discussed herein may be implemented in a variety of embodiments, and that the foregoing discussion of certain of these embodiments does not necessarily represent a complete description of all possible embodiments.

Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A base station for a wireless network, comprising:
   a receiver to receive a pair of indices from a mobile device over a communication channel of a closed-loop multiple-input and multiple-output (MIMO) system, the pair of indices to comprise a first index to represent a first direction for a set of transmitter antennae computed from wideband information for the communication channel, and a second index to represent a second direction for the transmitter antennae relative to the first direction, the first direction to comprise an averaged beamforming direction computed by application of a weight vector over a window of beamforming direction samples.

2. The base station of claim 1, the second direction to comprise an ideal beamforming direction.

3. The base station of claim 1, the second index to comprise a differential value representing a difference in beamforming direction between the first and second directions.

4. The base station of claim 1, the second index to comprise 4 bits.

5. The base station of claim 1, the first index or the second index to correspond to a codebook with one or more beamforming matrices.

6. The base station of claim 1, comprising a transmitter to transmit information on the set of transmitter antennae in the first and second directions.

7. A base station for a wireless network, comprising:
   a receiver to receive a pair of indices over a communication channel of a closed-loop multiple-input and multiple-output (MIMO) orthogonal frequency-division multiple access (OFDMA) system;
   a circuit to select antenna weights for a set of transmitting antennae based on the pair of indices, the pair of indices comprising a first index to represent a first transmit direction computed from wideband information for the communication channel, and a second index to represent a second transmit direction relative to the first transmit direction, the first transmit direction to comprise an averaged beamforming direction computed by application of a weight vector over a window of beamforming direction samples; and
   a transmitter to perform a transmit operation on the set of transmitter antennae using the antenna weights.

8. The base station of claim 7, the second transmit direction to comprise an ideal beamforming direction.

9. The base station of claim 7, the second index to comprise a differential value representing a difference in transmit direction between the first and second transmit directions.

10. The base station of claim 7, the second index to comprise 4 bits.

11. The base station of claim 7, the antenna weights comprising part of a beamforming matrix for the set of transmitting antennae, the beamforming matrix comprising a $N_t$ by $N_s$ matrix.

12. The base station of claim 7, comprising a memory to store a codebook corresponding to the received indices.

13. The base station of claim 7, wherein the transmitter utilizes eight transmitter antennae ($N_t$).

14. A mobile device for a wireless network, comprising:
a transmitter to transmit a pair of indices to a base station over a communication channel of a closed-loop multiple-input and multiple-output (MIMO) system, the pair of indices to comprise a first index to represent a first direction for a set of transmitter antennae at the base station computed from wideband information for the communication channel, and a second index to represent a second direction for the transmitter antennae relative to the first direction, the first direction to comprise an averaged beamforming direction computed by application of a weight vector over a window of beamforming direction samples.

15. The mobile device of claim 14, the second transmit direction to comprise an ideal beamforming direction.

16. The mobile device of claim 14, the first direction computed from a first set of measured channel conditions for the communication channel, and the second direction computed from a second set of measured channel conditions.

17. The mobile device of claim 14, the second index to comprise a differential value representing a difference in transmit direction between the first and second directions.

18. The mobile device of claim 16, comprising a memory to store a codebook corresponding to the transmitted indices.

* * * * *